US012807415B2

(12) United States Patent
Sohm et al.

(10) Patent No.: US 12,807,415 B2
(45) Date of Patent: Nov. 24, 2026

(54) STORAGE AND RETRIEVAL SYSTEM

(71) Applicant: LTW Intralogistics GmbH, Wolfurt (AT)

(72) Inventors: Rainer Ernst Sohm, Dornbirn (AT); Werner Ruescher, Warth (AT)

(73) Assignee: LTW Intralogistics GmbH, Wolfurt (AT)

( * ) Notice: Subject to any disclaimer, the term of this patent is extended or adjusted under 35 U.S.C. 154(b) by 373 days.

(21) Appl. No.: 18/242,318

(22) Filed: Sep. 5, 2023

(65) Prior Publication Data

US 2023/0406634 A1 Dec. 21, 2023

Related U.S. Application Data

(63) Continuation of application No. PCT/EP2022/055632, filed on Mar. 4, 2022.

(30) Foreign Application Priority Data

Mar. 5, 2021 (DE) ..................... 10 2021 105 391.9

(51) Int. Cl.
*G06F 17/00* (2019.01)
*B65G 1/137* (2006.01)

(52) U.S. Cl.
CPC .................................. *B65G 1/1375* (2013.01)

(58) Field of Classification Search
CPC .. B65G 1/1375; B65G 1/0442; B65G 1/0414; B65G 2201/0217

(Continued)

(56) References Cited

U.S. PATENT DOCUMENTS 2,899,087 A * 8/1959 Jacobsen ................. E04H 6/183 414/256
4,968,208 A * 11/1990 Friberg ................... E04H 6/183 414/256

(Continued)

FOREIGN PATENT DOCUMENTS

BR 112020017031 A2 * 2/2021 ......... B65G 69/2882
CN 105280416 A 1/2016

(Continued)

OTHER PUBLICATIONS

Pallet Shuttle Interlake Mecalux (Year: 2025).*
International Search Report dated Jun. 8, 2022 in corresponding application PCT/EP2022/055632.

*Primary Examiner* — Ronnie M Mancho
(74) *Attorney, Agent, or Firm* — Muncy, Geissler, Olds & Lowe, P.C.

(57) ABSTRACT

A storage and retrieval system for a high-bay warehouse comprising at least two self-propelling shuttle vehicles, which comprise a lifting device and are set up to move into and out of storage channels of the high-bay warehouse in order to deliver a loading unit to a storage space of the high-bay warehouse or to pick up a loading unit from a storage space. A transport platform in a rack aisle of the high-bay warehouse which is self-propelled or carried in a direction of travel, which is set up to receive at least two of the shuttle vehicles in a row oriented perpendicularly with respect to the direction of travel arranged one behind the other. A first shuttle vehicle is set up to lift, transport and set down a loading unit completely automatically, and wherein the first shuttle vehicle and a second shuttle vehicle are set up only at a distance from one another to lift, synchronously transport and set down part of a joint loading unit.

10 Claims, 5 Drawing Sheets

(58) Field of Classification Search
USPC .......................................................... 700/218
See application file for complete search history.

(56) References Cited

U.S. PATENT DOCUMENTS

| | | | | |
|---|---|---|---|---|
| 5,292,218 | A * | 3/1994 | Ikenouchi | E04H 6/183 414/256 |
| 5,851,098 | A * | 12/1998 | Buckenauer | E04H 6/285 414/253 |
| 9,389,614 | B2 | 7/2016 | Shani | |
| 9,809,391 | B2 | 11/2017 | Weiland et al. | |
| 2008/0031711 | A1* | 2/2008 | Yook | E04H 6/183 414/253 |
| 2011/0133419 | A1 | 6/2011 | Takehara et al. | |
| 2021/0098143 | A1* | 4/2021 | Trojer | B63B 77/00 |

FOREIGN PATENT DOCUMENTS

| | | | | | |
|---|---|---|---|---|---|
| CN | 105619049 | A | | 6/2016 | |
| CN | 106826180 | A | | 6/2017 | |
| CN | 209781857 | U | | 12/2019 | |
| CN | 210116886 | U | | 2/2020 | |
| DE | 2930569 | A1 | | 2/1981 | |
| DE | 9301506 | | * | 2/1993 | B65G 1/0492 |
| DE | 9301506 | U1 | | 7/1993 | |
| DE | 102010005591 | A1 | | 7/2011 | |
| DE | 102010021705 | A1 | | 12/2011 | |
| DE | 102013014102 | A1 | | 2/2015 | |
| DE | 102017104751 | A1 | | 9/2018 | |
| EP | 2937261 | A2 | | 10/2015 | |
| EP | 3786086 | A1 | | 3/2021 | |
| JP | 2010014671 | A | | 1/2010 | |
| WO | WO-2006121233 | A1 | * | 11/2006 | E04H 6/305 |
| WO | WO-2008013846 | A2 | * | 1/2008 | G06K 7/10881 |
| WO | WO2008136659 | A1 | | 11/2008 | |
| WO | WO-2022184924 | A1 | * | 9/2022 | B65G 1/0442 |

* cited by examiner

STORAGE AND RETRIEVAL SYSTEM

This nonprovisional application is a continuation of International Application No. PCT/EP2022/055632, which was filed on Mar. 4, 2022, and which claims priority to German Patent Application No. 10 2021 105 391.9, which was filed in Germany on Mar. 5, 2021, and which are both herein incorporated by reference.

BACKGROUND OF THE INVENTION

Field of the Invention

The invention relates to a storage and retrieval system for a high-bay warehouse comprising a transport platform which is self-propelling or carried along and at least two shuttle vehicles which are mechanically unconnected to one another.

Description of the Background Art

Storage and retrieval systems, which comprise a storage and retrieval machine with a transport platform that is carried along and several shuttle vehicles, are known, for example, from DE 10 2010 005 591 A1.

The handling of loads of different lengths by means of well-known storage and retrieval machines is associated with difficulties. If the shuttle vehicle is shorter than the loading unit, long loading units may tip over or will not be supported at the designated transport pick-up points. If the shuttle vehicle is significantly longer than the loading unit to be picked up, it may happen that the loading unit is picked up off-center, which increases the load on the shuttle vehicle. In addition, in so-called multi-depth racks which are formed by a plurality of storage spaces arranged one behind the other, such a loading unit picked up off center cannot be deposited at the end of the channel of the storage channel leading to the storage spaces in the storage compartment.

SUMMARY OF THE INVENTION

It is therefore an object of the present invention to provide a storage and retrieval system for a high-bay warehouse that is more easily adaptable to load units of different lengths.

The storage and retrieval system for the high-bay warehouse according to the invention comprises at least two self-propelling shuttle vehicles which are mechanically unconnected to each other and comprise a lifting device and are equipped to move into or out of storage channels of the high-bay warehouse in order to deposit a loading unit in a storage space of the high-bay warehouse or to pick up a loading unit from a storage space. The storage and retrieval system also includes a transport platform that is self-propelled in a direction of travel in a rack aisle of the high-bay warehouse or, in particular, carried along by a storage and retrieval device, which is set up to receive at least two of the shuttle vehicles arranged one behind the other in a row oriented perpendicularly with respect to the direction of travel. A first shuttle vehicle is set up to lift, transport and set down a loading unit completely automatically. The first shuttle vehicle is also set up together with a second shuttle vehicle to lift, synchronously transport and set down only part of a joint loading unit at a distance of the shuttle vehicles from each other. Preferably, the lifting and lowering of the load by the shuttle vehicles also take place synchronously.

In this way, the first shuttle vehicle can be used to transport, store, and retrieve shorter load units in isolation. The use of the second shuttle vehicle is therefore not necessary for short loading units, but it is possible. If a loading unit is to be stored or removed that significantly exceeds the length of the first shuttle vehicle, this joint, long loading unit can be handled with both shuttle vehicles by using the second shuttle vehicle. The storage and retrieval system according to the invention can be adapted more flexibly regarding the loading units to be stored, wherein the mechanical disconnection between the two channel vehicles increases this flexibility even more significantly.

It has proven to be advantageous if the second shuttle vehicle is constructed and set up identically to the first shuttle vehicle to lift, transport and set down a loading unit completely automatically. In this way, both the first shuttle vehicle and the second shuttle vehicle can transport, store, and retrieve shorter loading units in isolation from each other. Longer loading units, on the other hand, are again transported jointly by both shuttle vehicles, wherein an optimized load pick-up takes place via the distance to be taken between the shuttle vehicles. In this case, the load-bearing capacity of the transport platform, in particular the transport platform of a storage and retrieval machine, is designed in such a way that the transport platform can transport the two loaded shuttle vehicles at the same time.

In order to be able to keep the load on the storage and retrieval machine as low as possible, but still to be able to handle loading units of different lengths, it has proven to be advantageous if the second shuttle vehicle is shortened as compared to the first shuttle vehicle and is set up as an auxiliary shuttle vehicle, exclusively to lift, transport and set down synchronously part of a joint loading unit together with the first shuttle vehicle formed as a main shuttle vehicle. Preferably, the lifting and lowering of the two shuttle vehicles are also carried out synchronously.

The two shuttle vehicles are preferably equipped with insulated displacement measuring devices. In particular, the displacement measuring devices are formed with a rotary encoder and thus free of optical systems for determining the distance between the two shuttle vehicles. This means that there is no optical measurement of the distance between the first channel vehicle and the second channel vehicle, but only the displacement measurement/position determination is carried out, for example via a barcode on the storage channels or via the number of revolutions of a rotary encoder. The use of an encoder and the avoidance of optical sensors reduces the manufacturing costs for such a shuttle vehicle. For this reason, it is preferred that the shuttle vehicles are each equipped with at least one displacement measuring device, each of which is formed with a rotary encoder, free of optical sensors.

It is possible that a third shuttle vehicle is available and that the first shuttle vehicle and the second shuttle vehicle and the third shuttle vehicle are equipped to lift, transport synchronously and set down only part of a joint loading unit at a distance from each other. In this way, particularly long or extra-long loading units can be handled by means of three or more shuttle vehicles.

To handle two different joint loading units, it may be advantageous in particular cases if the lifting device of at least one of the shuttle vehicles comprises two separately operated lifting platforms arranged one behind the other in a row perpendicular to the direction of travel of the self-propelled or carried transport platform. This makes it easier, for example, to store two loading units that are transported together by three shuttle vehicles at various locations in the high-bay warehouse.

It is therefore also possible to transport a chain of loading units at the same time, wherein it is advantageous if the first shuttle vehicle and the second shuttle vehicle are set up to lift and set down only one part of a first joint loading unit at a distance from each other, if the second shuttle vehicle and the third shuttle vehicle are set up to lift a second joint loading unit, and when the first shuttle vehicle and the second shuttle vehicle and the third shuttle vehicle are set up, at a distance from each other, to transport the first and second joint loading units synchronously. Preferably, the first and second joint loading units can also be raised or set down synchronously.

Optionally, a middle shuttle vehicle, which can receive several loading units together with other shuttle vehicles, can be equipped with a subdivided and separately controllable lifting device. This makes it possible for a loading unit that has been lifted together, e.g., with the front shuttle vehicle, to be set down separately without having to place the loading unit that is picked up together with the rear shuttle vehicle at the same location.

It is advantageous if the transport platform carried along is part of a storage and retrieval machine, which can be positioned in the rack aisle by a (propulsion) drive of the storage and retrieval machine, and which is height-adjustable by means of a lifting drive of the storage and retrieval machine, in particular perpendicularly with regard to the direction of travel of the storage and retrieval machine and perpendicularly with regard to the row of shuttle vehicles or perpendicularly with regard to the direction of travel of the shuttle vehicles. In this way, it is also possible to service storage spaces or storage compartments on other levels, while also making optimal use of the space for storage compartments provided by the building of the high-bay warehouse.

Alternatively, or additionally, if the (self-propelled) transport platform is set up, it has proven to be efficient to move through the rack aisle on several levels, and if a vertical conveyor is present and set up, the transport platform to move between at least two of the levels of the high-bay warehouse. This means that the self-propelled transport platform requires less energy.

The features and combinations of features mentioned above in the description as well as the features and combinations of features mentioned below in the figure description and/or shown in the figures alone can be used not only in the respective specified combination, but also in other combinations or in a unique position without departing from the scope of the invention. Thus, embodiments not explicitly shown or explained in the figures, but which emerge from the explanations and can be produced by separate combinations of features are also to be regarded as covered and disclosed by the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
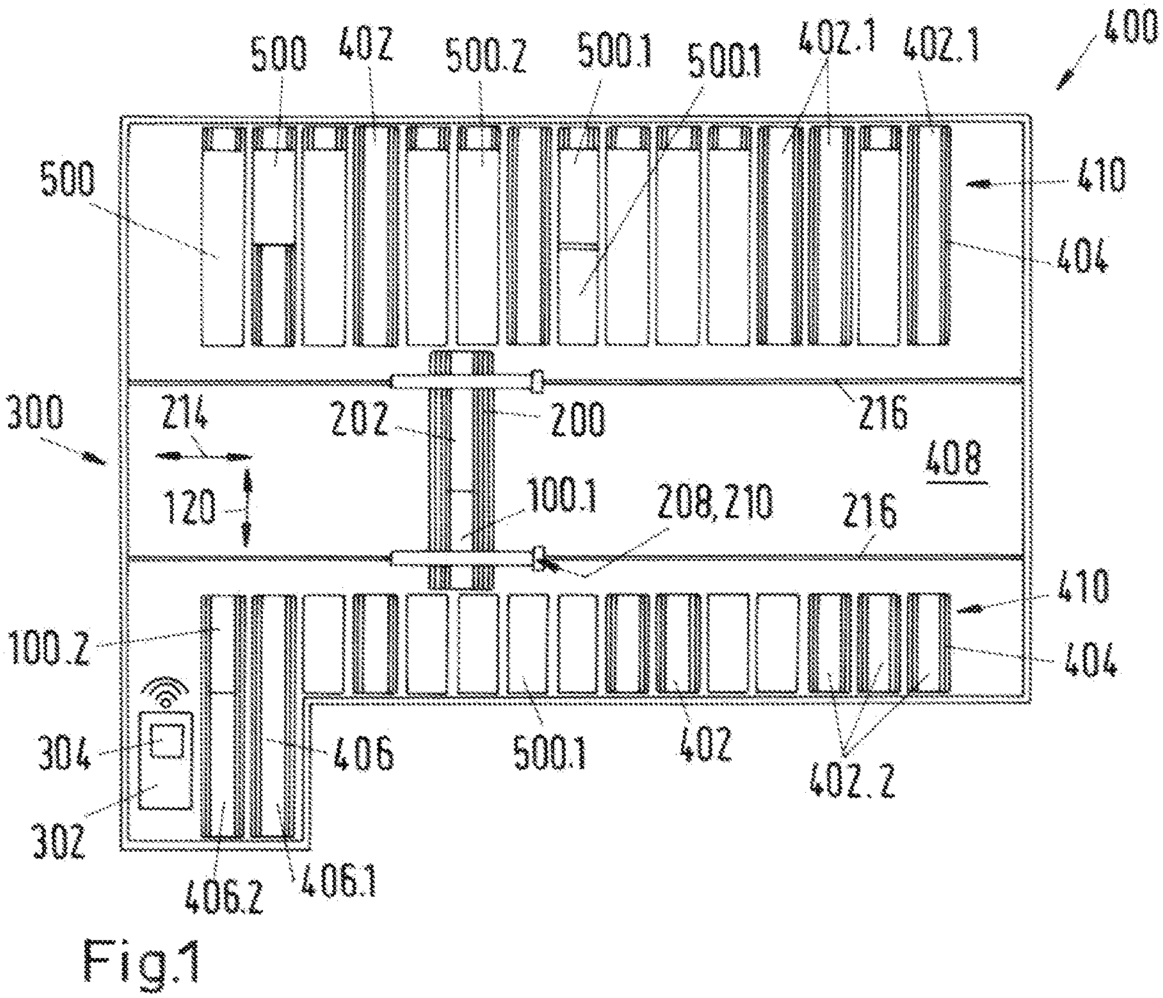
FIG. 1 is a schematic top view of a high-bay warehouse with a storage and retrieval system.

FIG. 1 shows a high-bay warehouse 400, which comprises several rows of racks 410 aligned parallel to each other. Each row of racks 410 is made up of a plurality of storage spaces 402 arranged side-by-side and one above the other, which are equipped with storage channels 404 to receive shuttle vehicles 100. In the present case, only two rows of racks 410 are shown, but a different number of rows of racks 410 is also possible. Depending on the desired throughput, there is also the advantageous possibility that the individual storage channels 404 are designed to be significantly longer than shown in FIG. 1, so that, for example, four or more than four loading units 500 can also be stored in a single storage channel 404. Between two of the rows of racks 410 there is a rack aisle 408, in which a storage and retrieval machine 200 of a storage and retrieval system 300 is arranged. The storage and retrieval machine 200 can be adjusted in the direction of travel 214 indicated by a double arrow, wherein the storage and retrieval machine 200 shown is guided on two rails 216. Instead of a rail-guided storage and retrieval machine 200, a rail-less storage and retrieval machine 200 can also be considered.

As an alternative to the use of a storage and retrieval machine 200 for feeding the storage channels 404, a further embodiment variant provides that a storage and retrieval system is used in which the loading units 500 are transported to the individual storage spaces 404 by means of one or more transport platforms 202 that are self-propelling in the respective storage level—preferably directly on the rack. The transport platforms 202 provided for this system are usually not equipped with their own lifting mechanism, with the help of which they could be raised or lowered to another storage level. In order to be able to transport the loading units 500 in this storage and retrieval system from one storage level to another storage level, either loading unit lifting elements are available—preferably integrated directly into the rows of racks—or lifting elements are used in another possible equipment variant, which can transport the aforementioned transport platforms together with the loading unit back and forth between the various storage levels: so-called vertical conveyors. These latter, combined transport platform/loading unit lifting elements are preferably located in the rack aisle 408. A storage and retrieval system is also conceivable, in which both lifting element variants described above are executed and complement each other in one and the same storage and storage system.

On the one hand, the high-bay warehouse 400, which is preferably integrated into a building, has very long or very deep storage spaces 402.1, which in the present case are designed to receive long, joint loading units 500.2. In the present case, the long storage spaces 402.1 are designed to receive a longitudinally oriented 40-foot ISO container. However, the long storage spaces 402.1 can also receive two shorter loading units 500.1, for example two 20-foot ISO containers in their longitudinal direction, so that the long storage space 402.1 can also be used for multi-depth storage of shorter loading units 500.1.

Purely by way of example, the rack row 410 with exclusively long storage spaces 402.1 is arranged on a first front side perpendicularly with respect to the direction of travel 214 of the storage and retrieval machine 200. On the opposite front side, perpendicular to the direction of travel 214 of the storage and retrieval machine 200, the rack row 410 is equipped with exclusively short storage spaces 402.2, which can only receive short loading units 500.1, i.e., in particular 20-foot ISO containers. In addition, a transfer zone 406 is integrated into the rack row 410 shown in the drawing at the bottom, which enables the storage and retrieval of loading units 500 into or out of the high-bay warehouse 400.

Each storage space 402 comprises a storage channel 404, which is preferably formed by two parallel C- or Z-shaped channel rails. The leg of the C- or Z-shaped rails, which is at the top with respect to a direction of fall, forms a support surface for the containers 500 to be stored. The shuttle vehicles 100 of the storage and retrieval system 300 can move into or out of these storage channels 404. In order to be able to transport a loading unit 500, the shuttle vehicles 100 are equipped with a lifting device 108.

In addition to the bearing assembly shown in FIG. 1 with storage channels 404, each of which consists of two channel rails, there is the possibility of storage spaces that are designed in such a way that shuttle vehicles 100 travel on a flat warehouse floor and that one or, if necessary, several guide rails in the direction of shuttle vehicle travel are available for lateral guidance. Depending on the design of the loading units 500, it is also possible that the loading units 500 are not placed on the upper legs of the C or Z rails, as described above, but that they are placed directly on the flat compartment floor that may be present. Alternatively, the loading units 500 can also be placed on individual selectively existing support brackets or the like. Further storage compartment formations, which represent combinations of the support surfaces described above, shuttle vehicle guide rail system and shuttle vehicle lanes, is also possible.

The storage and retrieval system 300 in the high-bay warehouse 400 also includes a schematically indicated higher-level control computer 302, which includes a communication module 304. The higher-level control computer 302 is shown here separately from the shuttle vehicles 100 and separately from the storage and retrieval machine 200. It is possible that a warehouse control computer is in communication with the higher-level control computer 302. In this design, the higher-level control computer 302 can then form a component of the storage and retrieval machine 200.

Figure 6:
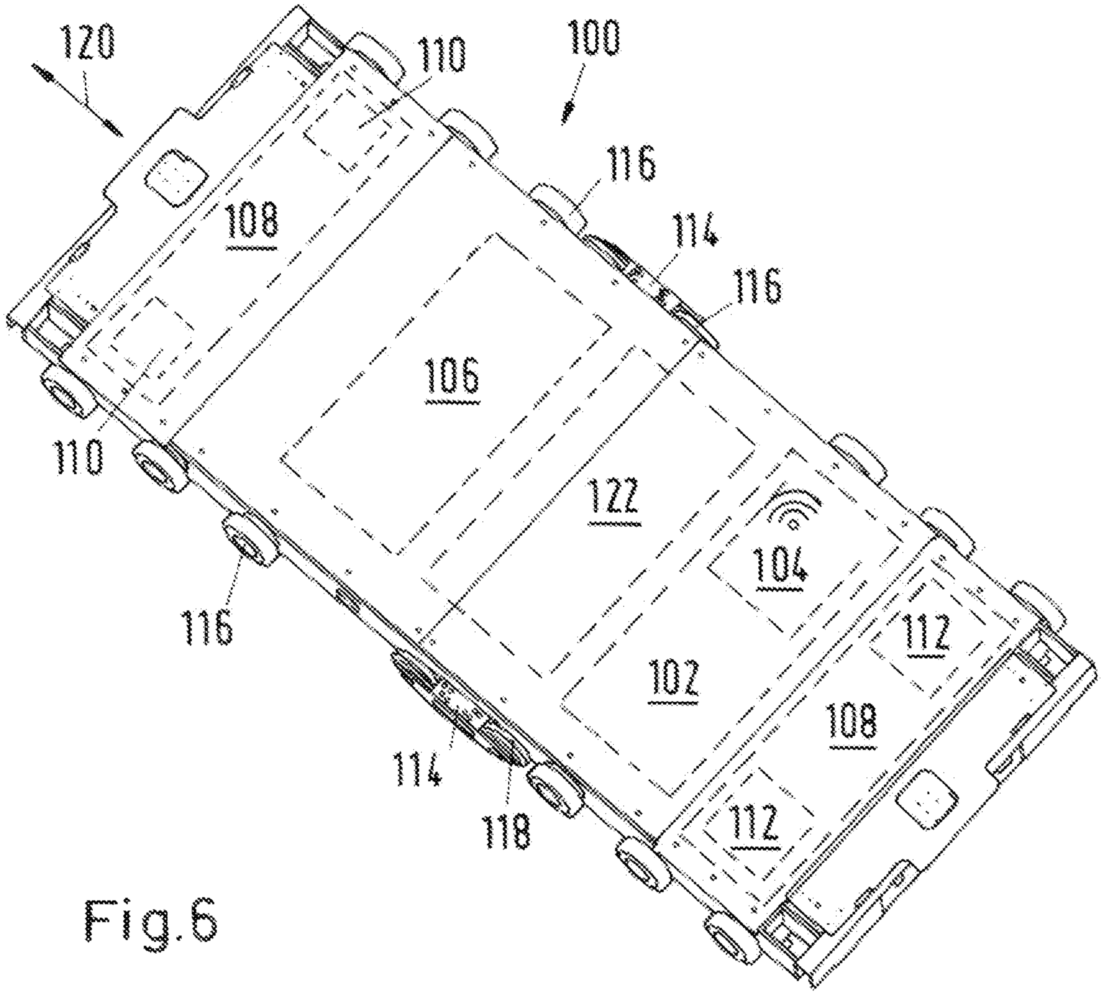
FIG. 6 is a schematic perspective view of a shuttle vehicle of the storage and retrieval systems.

FIG. 6 shows a schematic structure of a possible shuttle vehicle 100. The shuttle vehicle 100 is equipped with a control device 102 and with a communication device 104. In addition, the shuttle vehicles 100 comprise a schematically depicted propulsion device 106 which is fed by an energy source or storage device 122, for example, by a PowerCap. Thus, the propulsion device 106 comprises at least one electric motor to drive at least two wheels 116, wherein more than two driven wheels 116 may also be present. Deviating from the illustration shown in FIG. 6, the shuttle vehicles 100 may also be three- or multi-lane, should this be necessary due to the maximum possible wheel load or due to the rack load.

In the present case, the schematically depicted lifting device 108 is formed with two pairs of lifting elements 110, 112, so that, if necessary, a single platform can be raised and lowered together to transport a loading unit 500. However, it is also possible to operate the lifting elements 110 separately from the lifting elements 112, wherein a platform does not necessarily have to be available, but also, for example, only protruding pins can be used, e.g., to transport containers. In order to be able to determine the position of the shuttle vehicles 100 within the warehouse and in particular to measure the distance traveled by the shuttle vehicle 100, a displacement measuring device 114 is available in the present case. This displacement measuring device 114 shown as an example is preferably fixed redundantly on the frame of the shuttle vehicle 100, wherein there is preferably a staggered arrangement of the displacement measuring devices 114 in the direction of travel 120 of the shuttle vehicle in order to ensure that a sufficiently accurate displacement measurement is carried out even in the event of a crossing over a gap. The displacement measuring device 114 shown here as an example is equipped with an unspecified encoder which detects the rotation of a moving wheel 118. In order to be able to take into account the clearances between the transport platform 202 of the storage and retrieval machine 200 and the storage compartment or storage channel 404, a traction drive is provided which carries a wheel rotating synchronously with the highlighted wheel 118, so that in the event of a crossing over a gap, it is ensured that the encoder fixed on the wheel 118 reliably detects the movement of the shuttle vehicle 100.

The control device 102 of the shuttle vehicles 100 is equipped to cause the drive device 106 of the shuttle vehicles 100 to move into or out of the storage channels 404 of the high-bay warehouse 400. The control device 102 is also arranged to cause the lifting device 108 to adjust the lifting devices 110, 112 between a raised and a lowered position. The control device 102 is further in communication with the two displacement measuring devices 114, so that the data of the displacement measuring devices 114 can be transmitted via the communication device 104 either to other shuttle vehicles 100 or to the higher-level control computer 302, in particular via its communication module 304.

Each communication link described in the context of the invention can be made via a radio connection (WLAN, Bluetooth, NFC, etc.), via data light barriers (optical microwave link), by means of a cable or by means of a conductor rail.

The higher-level control computer 302 controls and monitors the status of the shuttle vehicles 100 and may, in particular, assign driving orders to the shuttle vehicles 100, monitor the distance between the shuttle vehicles 100, initiate an emergency shutdown in the event of an imminent collision of the shuttle vehicles 100, and output the status of the individual shuttle vehicles 100 by means of a visualization on a display device. In addition, the higher-level control computer 302 can output the operating status and the status of the access control systems of the high-bay area in which the shuttle vehicles 100 are located.

It is possible that exactly one of the shuttle vehicles 100 is formed as a master shuttle vehicle and is equipped with a control device 102 which is in bidirectional communication with the higher-level control computer 302, and that at least one shuttle vehicle 100 formed as a slave shuttle vehicle is equipped with a control device 102, which in turn is in bidirectional communication with the control device 102 of the master shuttle vehicle. In this case, the at least one slave shuttle vehicle receives its driving and lifting commands from the associated master shuttle vehicle.

Preferably, however, the control devices 102 of all shuttle vehicles 100 are in bidirectional communication with the communication module 304 of the higher-level control computer 302. In this way, there are shortened data transmission paths between the higher-level control computer 302 and the shuttle vehicles 100. If the higher-level control computer 302 is not installed on the storage and retrieval machine 200, the communication module 304 is also in communication with a controller 210 of the storage and retrieval machine 200. This controller 210 also includes a communication device 208 for bidirectional communication with the higher-level controller 302. The higher-level control computer 302 then also assigns the driving and lifting commands to the storage and retrieval machine 200.

In the present case, the higher-level control computer 302 is set up to induce the shuttle vehicles 100, depending on the data of the displacement measuring devices 114 reported back to it by at least one of the control devices 102, to move at a distance from each other so that they can drive behind each other or side by side at the same speed, mechanically unconnected to one another.

Figure 2:
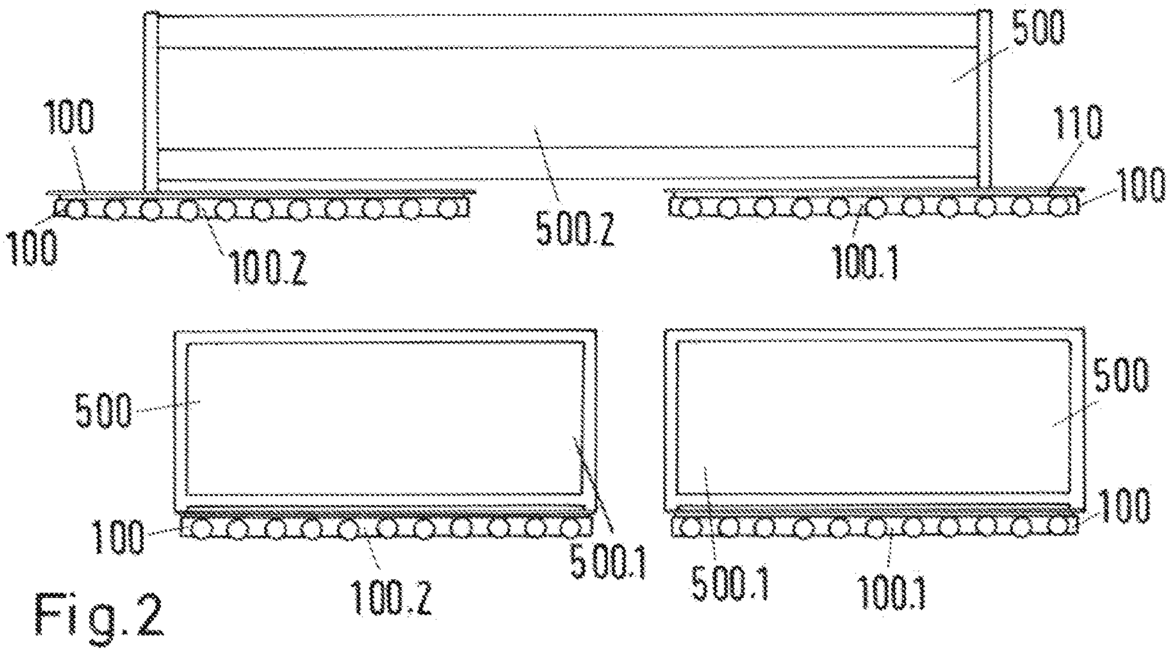
FIG. 2 shows two schematic side views of the shuttle vehicles, wherein in the upper view a joint loading unit is supported by both shuttle vehicles, and in the lower view the two shuttle vehicles are shown, each carrying a loading unit completely automatically.

This can be seen in more detail on the basis of FIG. 2, wherein the upper representation of the figure shows a joint loading unit 500.2 carried by two shuttle vehicles 100. The lower illustration of the figure shows that both a first shuttle vehicle 100.1 and a second shuttle vehicle 100.2 are identically constructed and are therefore both designed to lift, transport, and also set down a short loading unit 500.1 completely automatically. At the same time, however, both the first shuttle vehicle 100.1 and the second shuttle vehicle 100.2 are equipped to lift, transport synchronously and also set down only a part of the joint loading unit 500.2 shown above at a distance from each other. For example, the joint loading unit 500.2 is a 40-foot ISO container. For example, the short loading unit 500.1 is a 20-foot ISO container. The distance between the two mechanically unconnected shuttle vehicles 100.1 and 100.2 is specified by the higher-level control computer 302 on the basis of the data of the displacement measuring devices 114 of the two shuttle vehicles 100, in particular as a function of the length of the loading unit 500 to be picked up. Depending on where the load-bearing points of the load are located, it may be necessary for the shuttle vehicles 100—in order to avoid overloading of individual shuttle vehicle axles—to occupy such a large distance from each other and to pick up the load so far to the outside that the shuttle vehicles 100 protrude beyond the load. If, however, the load-bearing points of a stored item are located further inside than shown in FIG. 2, it is possible that the shuttle vehicles 100 do not protrude beyond the stored items and thus the storage channels 404 and the aisle width of the rack aisle 408 can be further optimized, in particular that they can be fully utilized.

Since a long loading unit 500.2 cannot be handled during every storage operation, it is also possible that one of the shuttle vehicles 100, in this case the second shuttle vehicle 100.2, remains in the transfer zone 406 and is only called in if a long loading unit 500.2 is to be stored. As an alternative to parking in the transfer zone 406, an unneeded shuttle vehicle 100 can also be parked at any other location, e.g., in one of the storage spaces 402. Since the shuttle vehicles 100 can be parked at any location and picked up again, if necessary, it is possible that the order of the shuttle vehicles 100 on the transport platform 202 of the storage and retrieval machine system may change from time to time. Particularly in the case of larger high-bay storage systems, where, for example, there are several self-propelling transport platforms 202 or those carried by a storage and retrieval machine 200, it may happen that different shuttle vehicles 100 are located on the transport platforms 202 at different times. The shuttle vehicles 100 are therefore not necessarily assigned to a single transport platform 202 but can be used freely. It is possible that these shuttle vehicles 100 will also be used to perform other transport tasks in the overall system, i.e., also transports for which no intermediate transport of the shuttle vehicle 100 on a transport platform 202 of the storage and retrieval system is required. An example of this is a transfer process within a long storage channel 402.1, in which a shuttle vehicle 100 transfers a plurality of loading units 500—initially parked at the front of the storage channel 404 for reasons of time—one after the other to the rear end of the storage channel 404.

Figure 3:
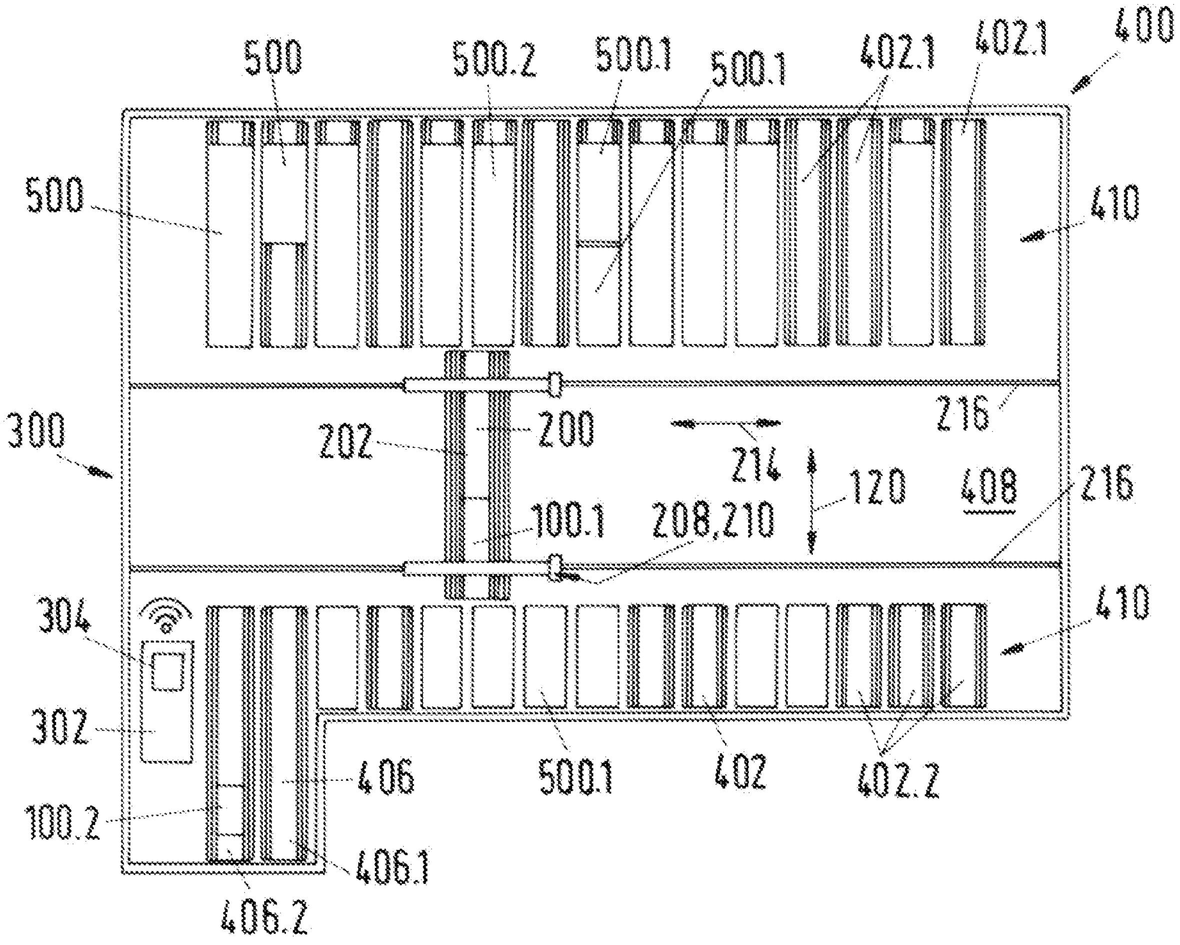
FIG. 3 shows the high-bay warehouse from FIG. 1 with a different design of a storage and retrieval system.
Figure 4:
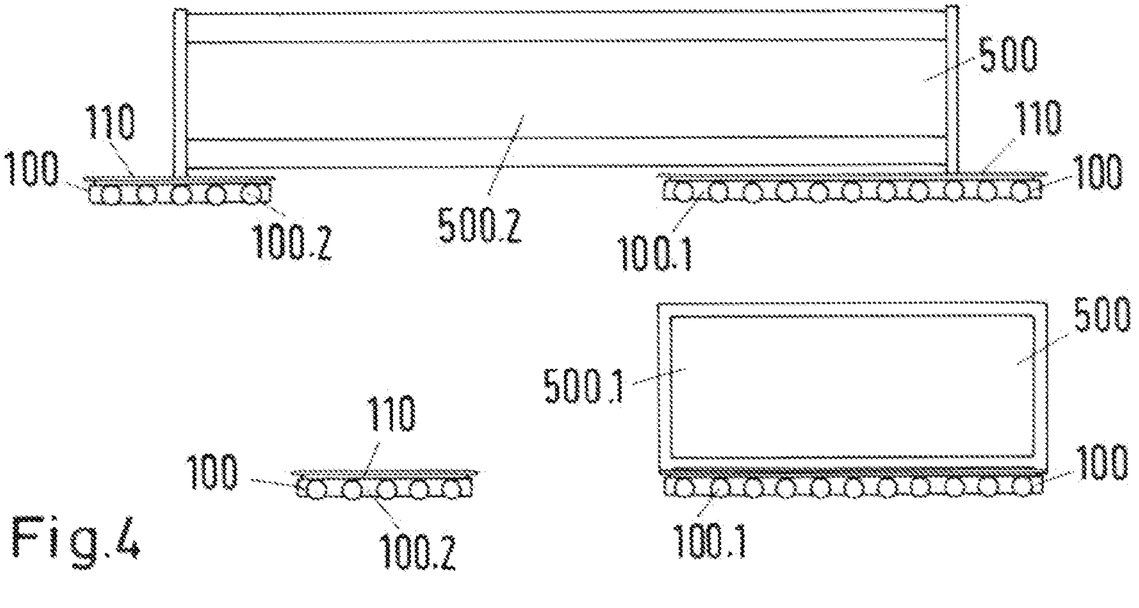
FIG. 4 is a representation of the shuttle vehicles of the storage and retrieval system per FIG. 2 according to FIG. 3.

FIGS. 3 and 4 refer to the possibility that transport tasks of differently designed shuttle vehicles 100 can be carried out jointly or by only one shuttle vehicle 100 alone in a storage and retrieval system. In the specific case of FIGS. 3 and 4, it is shown that the second shuttle vehicle 100.2 is shortened as compared to the first shuttle vehicle 100.1 and is set up as an auxiliary shuttle vehicle, exclusively for the purpose of lifting, synchronously transporting and also setting down a part of a joint loading unit 500.2 together with the first shuttle vehicle 100.1, which was formed as a main shuttle vehicle. Thus, the first shuttle vehicle 100.1 is to be regarded as a "full-fledged" shuttle vehicle 100, which is trained, for example, to transport 20-foot ISO containers on its own. However, if a 40-foot ISO container is to be stored or retrieved, the second shuttle vehicle 100.2 is called in to transport the long loading unit 500.2 together with the first shuttle vehicle 100.1.

Just as the shuttle vehicle 100.2 in FIG. 4 is a special shuttle vehicle that is only used for the transport of special loading units (in this case the long loading units 500.2), it is also possible that there are other special shuttle vehicles in a storage system, which are normally temporarily parked somewhere in a storage channel 404 or at a charging station and are only used when needed, e.g., to supplement the "standard" shuttle vehicle 100.1 or even to replace it for the duration of the special transport. Such a special shuttle vehicle could, for example, be formed with a raised lifting element that makes it possible to receive a loading unit 500 whose load bearing points are significantly higher than those surfaces on which the loading unit 500 can be placed in the warehouse. Depending on the storage layout and variety of stored goods, it is therefore possible that there are far more shuttle vehicles 100 in a storage system than are used for transport purposes at the same time.

Figure 5:
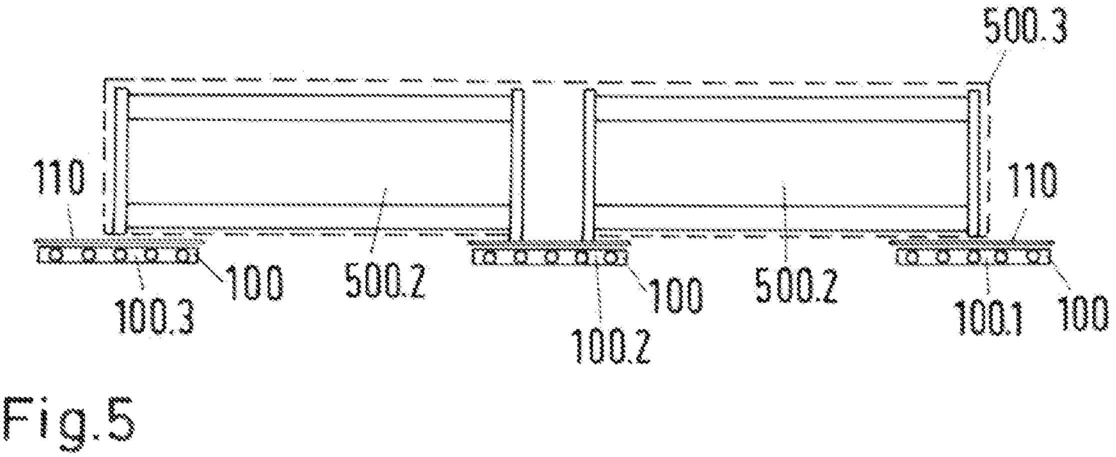
FIG. 5 is a schematic side view of the shuttle vehicles of another storage and retrieval system, in which three of the shuttle vehicles carry two loading units or in which the three shuttle vehicles carry a joint loading unit shown in dashes.

FIG. 5 refers to the possibility that a third shuttle vehicle 100.3 may also be present, and that the first shuttle vehicle 100.1 and the second shuttle vehicle 100.2 and the third shuttle vehicle 100.3 are equipped to lift, transport synchronously and also set down only a part of a joint, in particular extra-long loading unit 500.3 at a distance from each other.

In addition, the first shuttle vehicle 100.1 and the second shuttle vehicle 100.2 are equipped to lift and set down only a part of a first joint loading unit 500.2 at a distance from each other. In addition, the second shuttle vehicle 100.2 and the third shuttle vehicle 100.3 are equipped to lift and set down a second joint loading unit 500.2. In addition, the first shuttle vehicle 100.1 and the second shuttle vehicle 100.2 and the third shuttle vehicle 100.3 are equipped to transport the first and second joint loading unit 500.2 synchronously at a distance from each other. Thus, a transport chain is also possible. In a preferred design variant, the middle shuttle vehicle 100.2 can be equipped with a subdivided lifting element 112, wherein the lifting element segments can be controlled separately and flexibly. This makes it possible, in the case of the transport chain described above, to deposit the loading units 500 at different points in the storage system.

Depending on the stored goods, it may also be necessary to use more than the three shuttle vehicles 100 shown in FIG. 5 and described above for the transport of a special loading unit 500 or a special loading unit chain. In a storage system with, for example, four or more than four shuttle vehicles 100, it is particularly possible that instead of a continuous transport chain with these, for example, four shuttle vehicles 100, each two shuttle vehicles 100 pick up a short loading unit together and these two loading units with the, e.g., four shuttle vehicles are then transported together on a transport platform 202 of the storage and retrieval system. Furthermore, mixed forms of, e.g., a large shuttle vehicle 100 and several smaller shuttle vehicles 100 are also possible.

Figure 7:
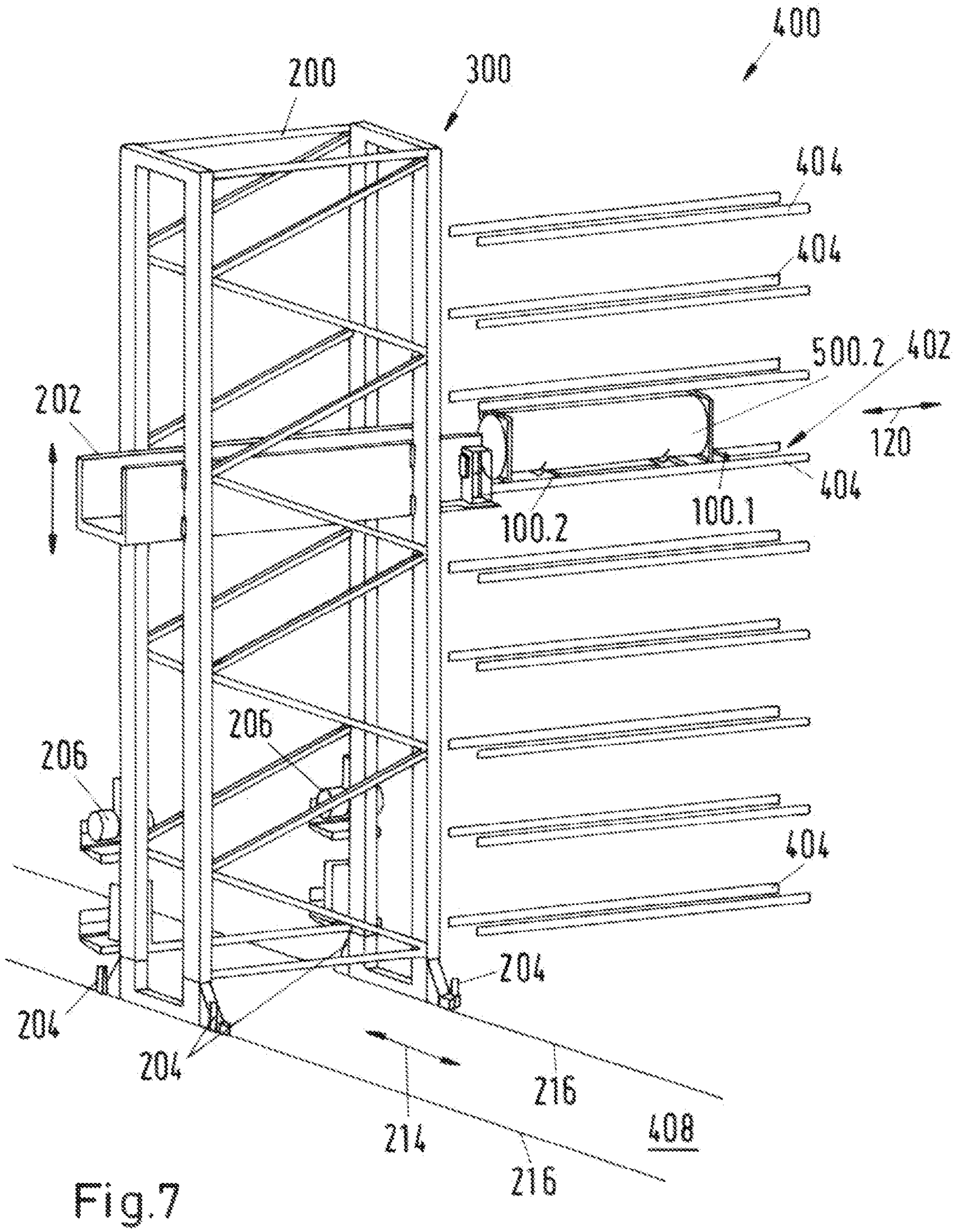
FIG. 7 is a schematic perspective view of the storage and retrieval machine of the storage and retrieval system, which is positioned opposite the schematically indicated rack in order to store a loading unit in a storage compartment.

FIG. 7 shows a possible design variant of a storage and retrieval system, which in the present case comprises a "classic" storage and retrieval machine 200, which includes a—carried, non-self-propelling—transport platform 202 for the transport of shuttle vehicles 100. The storage and retrieval machine 200 could be used in a high-bay warehouse 400 according to FIGS. 1 and 3. This storage and retrieval machine 200 is formed by two vertical, parallel rectangular frames, which are connected to each other by transverse connections perpendicular to the direction of travel 214 of the storage and retrieval machine 200. On the front side, i.e., perpendicular with respect to the direction of travel 214, i.e., on their sides facing the storage channels 404 or the transfer zone 406, the two rectangular frames aligned parallel to each other are open, so that a loading unit 500 can be moved into the "interior" of the frames onto a transport platform 202 of the storage and retrieval machine 200. The two frame parts can be connected to each other via several cross braces and stiffened, in particular in the sense of a truss to increase stability.

In order to be able to adjust the storage and retrieval machine 200 along the direction of travel 214 indicated by a double arrow, a drive device 204 is available in the present case, wherein at the two lower corners of the frame of the storage and retrieval machine 200 there is an electric motor 204 for the drive of the storage and retrieval machine 200 along the rails 216 in the rack aisle 408. The electric motors of the drive device 204 are driven synchronously. In the design shown here, an electric motor of a lifting device 206 is attached to the vertical masts of the respective frames for lifting and lowering the transport platform 202. The lifting or lowering of the transport platform is carried out, for example, by means of a rope, a chain, or a belt drive.

In addition, two shuttle vehicles 100 can again be seen entering a storage channel 404 with a joint loading unit 500.2, with the direction of travel 120 of the shuttle vehicles 100.1 and 100.2 aligned perpendicular to the direction of travel 214 of the storage and retrieval machine 200. It can be seen that the transport platform 202 is equipped to receive at least two of the shuttle vehicles 100 arranged one behind the other in a row perpendicular to the direction of travel 214 of the storage and retrieval machine 200. However, it is also possible that the transport platform 202 provides more than two transport spaces 212 for shuttle vehicles 100 in order to be able to handle correspondingly extra-long loading units 500.3.

Figure 8:
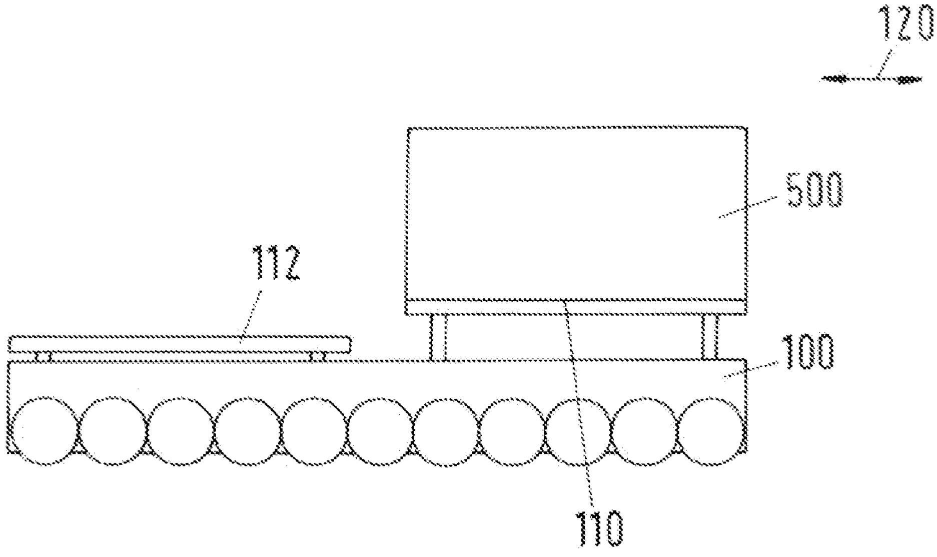
FIG. 8 is a schematic side view of another shuttle vehicle with two, in particular separately controllable lifting elements.

FIG. 8 refers to the possibility that, in order to increase the flexibility of the loads or loading units 500 to be transported, the shuttle vehicles 100 may also be formed with two separately actuated lifting elements 110, 112, which are arranged one behind the other in a row aligned perpendicular to the direction of travel 214 of the storage and retrieval machine 200. Shuttle vehicles 100 of this type can be used very flexibly. For example, according to FIG. 8, this shuttle vehicle 100 can be used to transport such a large load that it has to be lifted with both lifting elements 110, 112. Or each of the lifting elements 110, 112 is used to transport its own, smaller load. Due to the possibility of controlling the lifting elements 110, 112 separately, there is also the advantage that these two small loads can be stored at different locations in the high-bay warehouse. In addition, it is possible to use a shuttle vehicle 100 according to FIG. 8 in conjunction with other, independent shuttle vehicles 100 for the transport of even larger loads. In this case, too, the advantage is that these jointly transported loads can be placed at different points in the warehouse if necessary.

Figure 9:
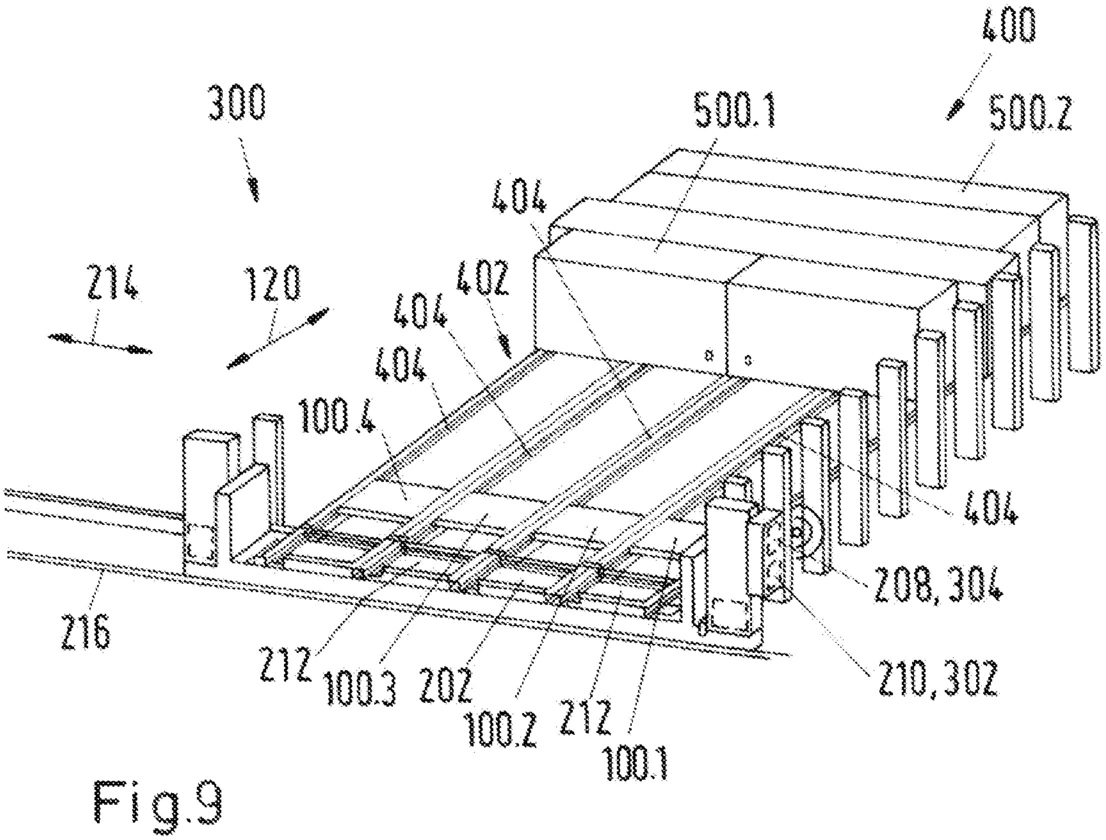
FIG. 9 is a schematic perspective view of yet another storage and retrieval system, in which the storage compartments are formed with a plurality of storage channels and the shuttle vehicles enter the plurality of the storage channels synchronously parallel to each other.

FIG. 9 refers to the possibility that the concept of synchronously operating shuttle vehicles 100 can also be used for the so-called transverse storage of stored goods. FIG. 9 shows a detailed view of a further design of the storage and retrieval system 300, wherein the storage and retrieval machine 200 can only be seen in sections, which in the present case only comprises a vertical frame and, if necessary, only one rail. This diagram illustrates that the controller 210 of the storage and retrieval machine 200 also includes the higher-level control computer 302 for the control and position detection of the shuttle vehicles 100. The communication device 208 thus forms the communication module 304 of the higher-level control computer 302.

It can be seen that the transport platform 202 of the storage and retrieval machine 200 has a plurality of transport locations 212 for shuttle vehicles 100. These transport locations 212 are arranged in a row in the direction of travel 214 of the storage and retrieval machine 200. Thus, the transport platform 202 is thus designed to pick up at least two of the shuttle vehicles 100 next to each other in a row aligned along the direction of travel 214 of the storage and retrieval machine 200 and to position them in such an alignment with a plurality of storage channels 404 of a single storage space 402 in such a way that at least two of the shuttle vehicles 100 can each synchronously move into or out of a separate storage channel 404 of the storage space 402. However, it is also possible that with a smaller load, only one of the shuttle vehicles 100 transports the load into the storage compartment alone. In the present case, a total of four shuttle vehicles 100 are shown, wherein, in the transport case shown in FIG. 9, the first shuttle vehicle 100.1, the second shuttle vehicle 100.2, the third shuttle vehicle 100.3 and the fourth shuttle vehicle 100.4 synchronously move into or out of four independent storage channels 404, which form a single storage space 402. In this storage space 402 it is possible for smaller loading units 500.1 to be placed next to each other. However, it is also possible to store a single large loading unit 500.2 in this single storage space 402, which can be raised, transported synchronously, and lowered again together by at least two, in this case by the four shuttle vehicles 100.1 to 100.4.

As an example, FIG. 1 illustrates a storage process for storing a joint loading unit 500.2 in a storage space 402 of the high-bay warehouse 400 with the storage and retrieval system 300.

First, a joint loading unit 500.2 is provided at a transfer zone 406, preferably at the first transfer zone 406.1 and, at the same time, subsequently or before, the transport pick-up points of the joint loading unit 500.2 are communicated to the higher-level control computer 302. The higher-level control computer 302 receives the information on the exact pick-up points of the loading units 500 either from another software or the exact pick-up points are determined by the higher-level control computer 302 on the basis of the measured values by sensors or camera systems. These sensors or camera systems can be permanently mounted or movable. It is also possible that individual sensors or camera systems required for this purpose are integrated on the shuttle vehicles 100. Combinations of the aforementioned acquisition methods for determining the exact pick-up points are also possible. Subsequently, the storage and retrieval machine 200 is moved and made available at the transfer zone 406, wherein the transport platform 202 has already received two self-propelling, mechanically unconnected shuttle vehicles 100. However, if only one of the two shuttle vehicles 100 is positioned on the transport platform 202, the storage and retrieval machine 200 can also first be moved to the second transfer zone 406.2 in order to load the second shuttle vehicle 100.2 onto the transport platform 202 of the storage and retrieval machine 200. Subsequently, the higher-level control computer 302 specifies the distance between the shuttle vehicles 100 on the basis of the position of the determined transport pick-up points of the joint loading unit 500.2. This distance is then occupied by the shuttle vehicles 100, after which the joint loading unit 500.2 is underrun at the transfer point on the instructions of the higher-level control computer 302. In the special cases in which at least some of the sensors or camera systems required to record the exact transport pick-up points are designed to travel on the shuttle vehicles 100, it may be that the shuttle vehicles 100 are already correctly positioned under the loading unit 500.2 to be picked up together at this time due to the measurement run. Then, a first part of the joint loading unit 500.2 is picked up by the first shuttle vehicle 100.1, and, at the same time or subsequently, a second part of the joint loading unit 500.2 is picked up by the second shuttle vehicle 100.2. "Picked up" is understood to mean the lifting of the lifting device 108 of the two shuttle vehicles 100. Subsequently, the joint loading unit 500.2 is transferred to the transport platform 202 of the storage and retrieval machine 200 by a synchronous movement of the two shuttle vehicles 100. The distance between the shuttle vehicles 100 is maintained by each of the shuttle vehicles 100 by means of the displacement measuring devices 114 available on the shuttle vehicles and monitored by the higher-level control computer. The storage and retrieval machine 200 is then moved to a storage compartment or a storage space 402 for the joint loading unit 500.2 and positions the transport platform 202, in particular also at its corresponding height, in such a way that it aligns with a storage channel 404 leading to the storage space 402. Subsequently, the joint loading unit 500.2 is moved to the storage space 402 by a synchronous movement of the shuttle vehicles 100, wherein the distance between the shuttle vehicles 100 is again maintained on the basis of the data of the displacement measuring device 114. Subsequently, the joint loading unit 500.2 is set down by the shuttle vehicles 100; i.e., the lifting device 108 is lowered again. The shuttle vehicles 100 can then be brought back to the transport platform 202 if necessary. The retrieval of a joint loading unit 500.2 is carried out in the reverse, analogous manner.

If, for example, several short loading units 500.1 are subsequently stored, it is possible that this is done with only one shuttle vehicle 100. In such a case, for example, the other shuttle vehicle 100 can be left in any storage compartment during this time. This is particularly useful if there are two shuttle vehicles of different sizes 100 in the system and the loading unit 500 is so large that the larger shuttle vehicle 100 would have to be used for storage. In this case, the smaller of the two shuttle vehicles 100 would only be "in the way" during the storage operations, in particular if the transfer zone 406 and the desired storage space are located on the other side of the rack aisle 408.

As a result, the present invention is characterized in that the distance between the two shuttle vehicles 100 does not have to be equipped with optical sensors for measuring the distance between the shuttle vehicles 100, but that the control of the distance is carried out by the higher-level control computer 302 on the basis of the data provided to it. In this way, a more robust storage and retrieval system 300 is created, as there is no need for time-consuming adjustment of optical sensors, wherein there is also increased reliability of the storage and retrieval system 300.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A storage and retrieval system for a high-bay warehouse, the system comprising:

at least two self-propelling shuttle vehicles which are mechanically unconnected to one another, the at least two self-propelling shuttle vehicles each comprising a lifting device and are set up move into or out of storage channels of the high-bay warehouse in order to deposit a loading unit in a storage space of the high-bay warehouse or to pick up a loading unit from a storage space; and a self-propelled or carried transport platform in a rack aisle of the high-bay warehouse in a direction of travel, which is set up to receive at least two of the shuttle vehicles arranged one behind the other in a row oriented substantially perpendicularly to the direction of travel, wherein a first shuttle vehicle is set up to lift, transport and set down a loading unit completely automatically, and wherein the first shuttle vehicle and a second shuttle vehicle are set up to lift, synchronously transport, and set down only a part of a joint loading unit at a distance from one another.

2. The storage and retrieval system according to claim 1, wherein the second shuttle vehicle is substantially identical to the first shuttle vehicle and is designed to raise, transport, and set down a loading unit completely independently.

3. The storage and retrieval system according to claim 1, wherein the second shuttle vehicle is shortened as compared to the first shuttle vehicle and is configured as an auxiliary shuttle vehicle exclusively to lift, transport, and set down synchronously part of a joint loading unit together with the first shuttle vehicle formed as a main shuttle vehicle.

4. The storage and retrieval system according to claim 1, wherein the first and second shuttle vehicles are each equipped with at least one displacement measuring device.

5. The storage and retrieval system according to claim 4, wherein displacement measuring devices are each formed with a rotary encoder, free of optical sensors.

6. The storage and retrieval system according to claim 1, wherein the lifting device of at least one of the shuttle vehicles comprises two separately operated lifting platforms arranged one behind the other in a row substantially perpendicular to the direction of travel of the self-propelled or carried transport platform.

7. The storage and retrieval system according to claim 1, further comprising a third shuttle vehicle, wherein the first shuttle vehicle and the second shuttle vehicle and the third shuttle vehicle are equipped to lift, transport synchronously, and set down only part of a joint loading unit at a distance from each other.

8. The storage and retrieval system according to claim 1, wherein the first shuttle vehicle and the second shuttle vehicle are set up to lift and set down only one part of a first joint loading unit at a distance from each other, if the second shuttle vehicle and the third shuttle vehicle are set up to lift and set down a second joint loading unit, and wherein the first shuttle vehicle and the second shuttle vehicle and the third shuttle vehicle are set up, at a distance from each other, to transport the first and second joint loading units synchronously.

9. The storage and retrieval system according to claim 1, wherein the transport platform carried along is part of a storage and retrieval machine, which is adapted to be positioned in the rack aisle by a drive of the storage and retrieval machine and which is height-adjustable via a lifting drive of the storage and retrieval machine.

10. The storage and retrieval system according to claim 1, wherein the transport platform is set up to move through the rack aisle on several levels, and wherein a vertical conveyor is present and set up to move the transport platform between at least two of the levels of the high-bay warehouse.

* * * * *